United States Patent Office 3,198,225
Patented Aug. 3, 1965

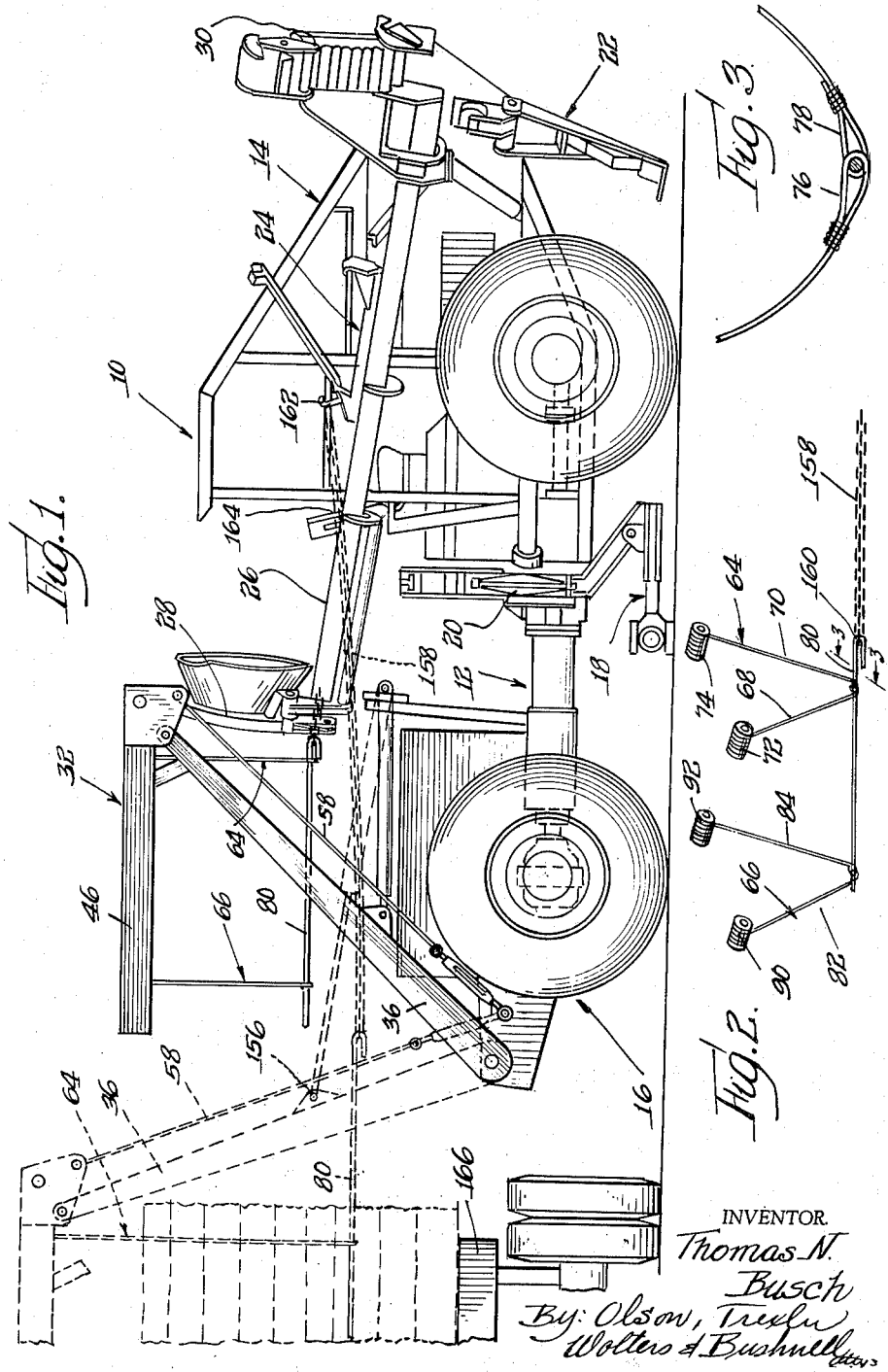

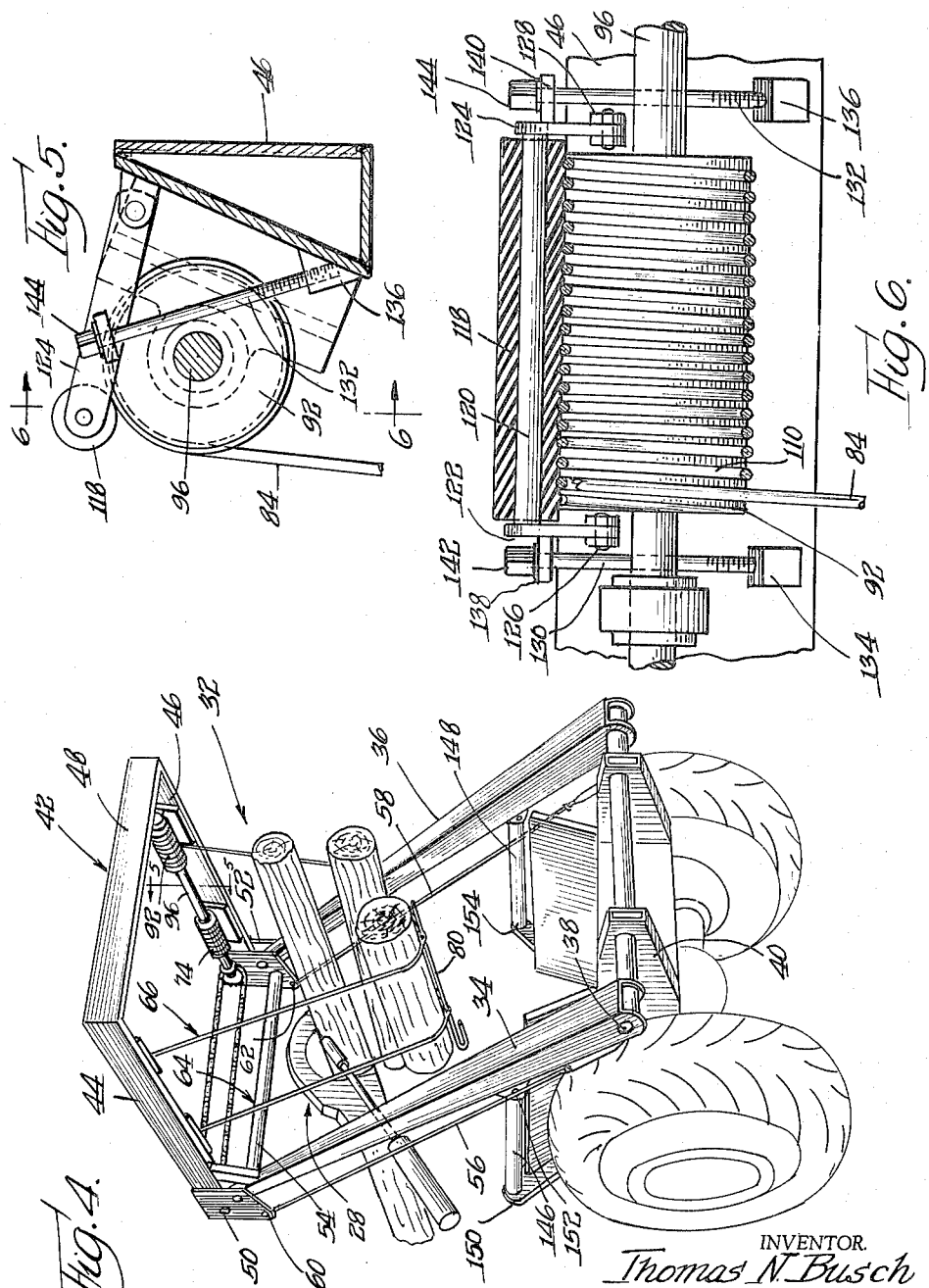

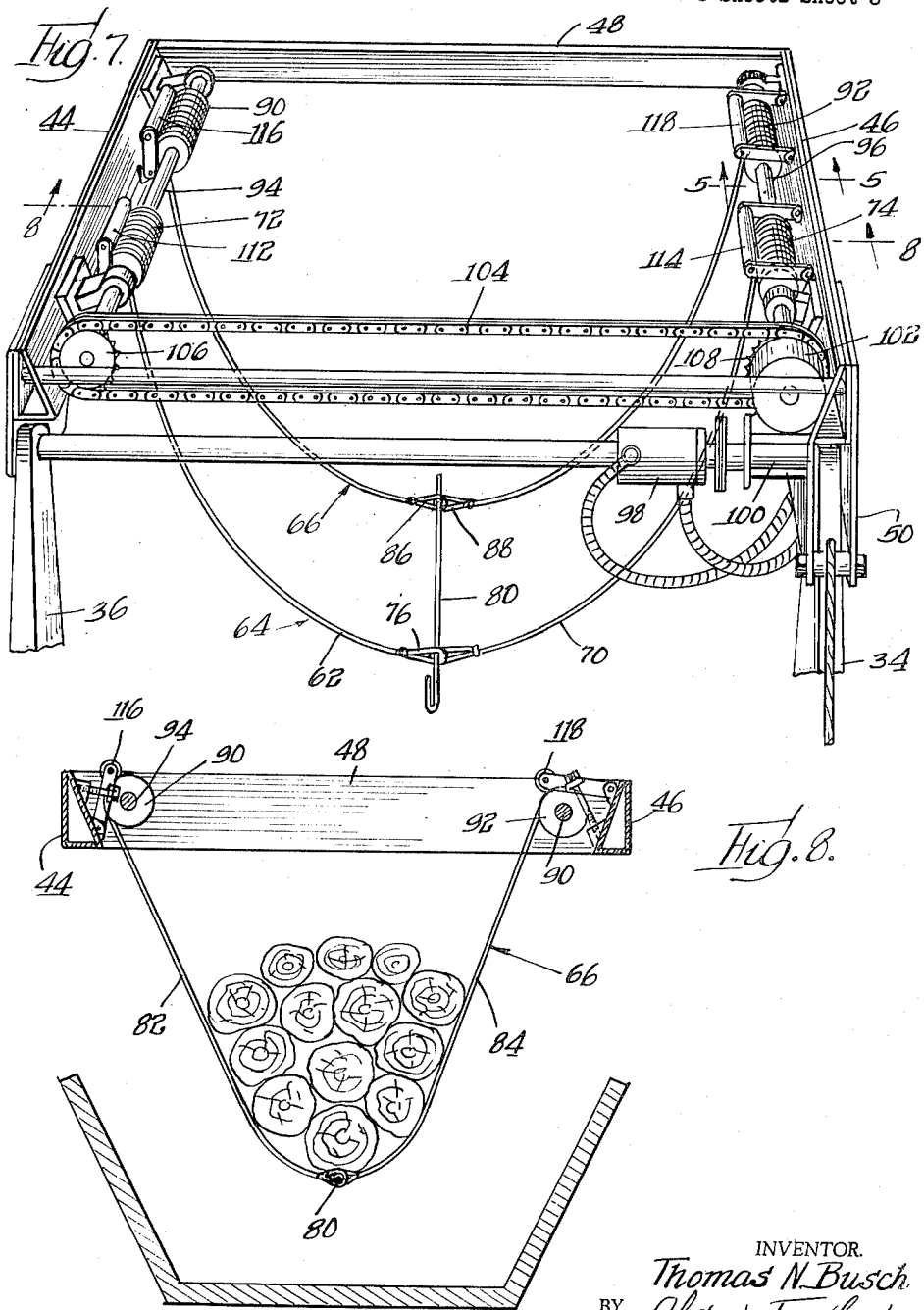

3,198,225
TREE HARVESTING APPARATUS
Thomas N. Busch, Daphne, Ala., assignor to Timberline Equipment Company, Bradley, Ill., a corporation of Illinois
Filed Nov. 29, 1962, Ser. No. 240,920
10 Claims. (Cl. 144—3)

The present invention relates to a novel apparatus for processing trees, and more specifically to a novel apparatus for harvesting trees.

Timber harvesting machines have heretofore been suggested for felling a standing tree and then sectionalizing or buckling the felled tree and stacking the severed sections or logs. Such a machine is shown in applicant's co-pending application Serial No. 210,368 filed July 17, 1962. Machines of the type shown in applicant's prior application have been generally successful and have represented substantial advance in the timber harvesting art, and the present invention contemplates a further significant advance whereby substantial economies may be effected in the harvesting of trees.

An important object of the present invention is to provide a novel apparatus which will enable a single operator to fell, buck, stack and, if desired, load trees in an efficient and economical manner.

A more specific object of the present invention is to provide a novel apparatus capable of severing successive sections from a tree and dropping such severed sections onto a stack while adjusting the height of the stack for minimizing the distance which each section must fall whereby to promote proper arrangement of the tree sections on the stack.

Still another object of the present invention is to provide a novel apparatus of the above described type which is adapted to unload or deposit stacks of logs on the ground or on top of previous stacks or on an elevated support surface such, for example, as a truck or railroad car.

Still another object of the present invention is to provide a novel apparatus of the above described type which may be easily transported or driven to any desired location, and which is relatively rugged and light in weight for promoting mobility.

Further objects and advantages of the present invention will become apparent from the following description and the accompanying drawings, wherein:

FIG. 1 is a side elevational view showing an apparatus incorporating features of the present invention;

FIG. 2 is a fragmentary perspective view showing elements of the apparatus adapted to receive and support a stack of logs;

FIG. 3 is an enlarged fragmentary sectional view taken along line 3—3 in FIG 2;

FIG. 4 is a rear perspective view of the apparatus;

FIG. 5 is an enlarged fragmentary sectional view taken along line 5—5 in FIG. 4;

FIG. 6 is a fragmentary sectional view taken along line 6—6 in FIG. 5;

FIG. 7 is a fragmentary top perspective view of a portion of the apparatus adapted to receive and support a plurality of tree sections or logs; and FIG. 8 is a fragmentary sectional view taken along line 8—8 in FIG. 7.

Referring now more specifically to the drawings wherein like parts are designated by the same numerals throughout the various figures, an apparatus 10 incorporating features of the present invention is shown in FIG. 1. The apparatus 10 comprises a vehicle or mobile frame 12 having a front or tractor portion 14 and a trailer portion 16. The tractor portion or unit 14 includes an engine and a source of hydraulic fluid under pressure for actuating the various cylinders of the apparatus in a manner described below. The trailer unit 16 is connected with the tractor unit 14 for relative pivotal movement about a longitudinally extending axis and a vertical axis for facilitating maneuvering of the vehicle over rough or wooded terrain. Reference is hereby made to the above mentioned co-pending application and to application Serial No. 5,919, filed February 1, 1960 for a more complete disclosure of the vehicle 12 including the articulated tractor and trailer units.

Mounted on an intermediate portion the vehicle 12 is a hydraulically actuated shearing head 18 suitably adjustably supported by a linkage mechanism 20. The shearing head 18 is adapted to sever a standing tree, and direct the fall of the tree forwardly along the tractor unit 14 and substantially parallel to the longitudinal axis of the vehicle.

A lifting mechanism 22 is disposed adjacent a forward end of the tractor unit 14 for catching a tree as the tree falls to the ground. The lifting mechanism is hydraulically actuated and adapted to raise an end portion of a felled tree, and position the tree on a carriage unit 24 of a tree feeding mechanism. The carriage 24 is mounted for movement along track means 26 and the feeding mechanism is provided with suitable hydraulically operated means for advancing and retracting the carriage 24 along the guide track means 26.

Another hydraulically actuated shearing or bucking head 28 is mounted adjacent the upper and trailing end of the feeding means for severing successive sections from a tree. In this connection, the carriage 24 of the feeding means is adapted to grip and feed a predetermined length or section of a tree past the shearing head 28 and to a position above the trailing unit 16 at which time the shearing head 28 is actuated to sever the tree section or log from the remainder of the tree for enabling the log to be stacked and further processed in the manner described in detail below. During the severing operation, the carriage 24 is retracted toward the forward end of the guide or track means 26 so as to be in a position for feeding another section of the tree.

Also mounted on the tractor unit 14 adjacent a forward end of the guide or track means 26 is a unit 30 having flexible knife edge means adapted to be wrapped around the trunk of a tree which has been positioned on carriage 24. The flexible knife means is adapted to sever branches from the tree trunk as the tree is fed or advanced by the carriage unit 24 past the shearing head 28.

The structural details of the shearing heads 18 and 28 and of the lifting means 22, the feeding carriage and track 24 and 26 and the delimbing mechanism 30 and the hydraulic and electrical control system therefor form no part of the present invention, but reference is made to the aforementioned co-pending applications for a complete disclosure with respect to such details. It suffices to state herein that the aforementioned means are constructed and arranged so that the shearing head 18 may first be used to fell a tree forwardly and across the lifting mechanism 22 which is then operated to raise an end portion of a tree trunk onto the carriage 24. The delimbing mechanism 30 is then actuted to position the flexible knife means around the tree trunk and the carriage 24 is actuated to advance or feed successive portions of the tree trunk past the shearing head 28 and to a position over the trailer unit 16. Of course the shearing head 28 is intermittently operated to sever the aforementioned successive portions from the remainder of the tree.

The trailer unit 16 is, in accordance with features of the present invention, provided with means 32 for receiving and catching logs severed by the shearing head 28, retaining said logs in stacked condition, and subsequently unloading a stack or bundle of logs onto the ground or at any desired elevated position.

The means 32 comprises a pair of generally upstanding frame members 34 and 36 having their lower ends pivotally supported on a shaft 38 mounted on the frame 40 of the trailer unit 16. Preferably the frame members 34 and 36 are hollow and have a box-like transverse cross section for providing strength and rigidity without unduly increasing the weight of the apparatus. A substantially horizontally disposed rectangular frame structure 42 is arranged at the upper ends of the frame members 34 and 36 and extends rearwardly therefrom. The generally horizontally disposed frame structure includes side frame members 44 and 46 having outer ends joined by a transverse frame member 48, all of which frame members are also preferably of hollow construction so as to reduce the weight of the unit. Ends of the side frame members 44 and 46 are respectively secured to brackets 50 and 52 which in turn are pivotally mounted on a shaft 54 extending between and supported by upper ends of the frame members 34 and 36. As will be described more in detail below, the frame members 34 and 36 are adapted to be pivoted between a forward log receiving position shown in solid lines in FIG. 1, and a rearward or extended log unloading position shown in broken lines in FIG. 1. In order to maintain the frame or head structure 42 in a generally horizontal position during such pivotal movement, links in the form of relatively lightweight cables 56 and 58 are respectively connected between the frame structure 40 of the trailer unit and laterally extending portions 60 and 62 of the brackets 50 and 52.

In order to receive and support a plurality of tree sections or logs, the means 32 is provided with a pair of flexible sling members 64 and 66 supported from the generally horizontal frame structure 42 for extending beneath the position at which each successive section of the tree is positioned while it is being severed by the shearing head 28. Furthermore it is important to note that the sling members 64 and 66 are adapted to be raised and lowered in the manner described below for assuring proper control of the logs and for enabling a bundle of logs to be stacked on the ground or at an elevated position.

In connection with maintaining the desired control over the logs, it is to be observed that while a tree section is being severed by the shearing head 28 it extends generally horizontally at a position well above the bottom or frame structure of the trailer unit. When the severing operation is completed, the log falls freely by gravity. If the log were permitted to fall freely to the bottom or frame structure of the trailer, it would necessarily travel a considerable distance and the log would probably bounce in an uncontrolled manner and into an undesirable or twisted position when it hits the bottom of the trailer. In such an event a workman must necessarily be employed to manually straighten or reposition the logs for enabling the desired stack or bundle of logs to be built up on the trailer unit. The employment of such a worker not only increases the cost of processing the trees but also places the worker in a position of substantial hazard, since it is possible for the falling logs to bounce in an unpredictable manner.

In accordance with an important feature of the present invention the aforementioned difficulties are eliminated and the desired control over the logs is obtained by adjusting the height of the sling members 64 and 66 so that each successive tree section or log falls only a few inches or a relatively short distance after it is severed by the shearing head 28. Furthermore the flexible cables or sling members are urged by the weight of the logs into close conformity with the sides of a stack of logs as indicated in FIGS. 4 and 8 whereby the logs are urged into a relatively tightly packed bundle.

As shown best in FIGS. 2 and 7, the sling member 64 comprises flexible cables 68 and 70 respectively having upper end portions wound on rollers 72 and 74. Lower end portions of the cables 68 and 70 are provided with rings or loops 76 and 78 shown best in FIG. 3. An elongated rod 80 is provided for slidably extending through the loops 76 and 78 and detachably securing the lower end portions of the cables 68 and 70 together. The sling member 66 is similarly constructed of a pair of flexible cables 82 and 84 having loops 86 and 88 at lower end portions thereof adapted to be connected by the rod 89. Upper end portions of the cables 82 and 84 are wound on rollers 90 and 92.

As shown best in FIG. 7, the rollers 72 and 90 are fixed on a shaft 94 which is rotatably supported by a suitable bracket and bearing means along the frame member 44. The rollers 74 and 92 are similarly fixed on a rotatably supported shaft 96 disposed along the frame member 46.

The shafts 94 and 96 are adapted to be rotated for winding the cables up on the rollers or lowering the cables. In order to drive the shafts 94 and 96, a rotary hydraulic motor 98 is suitably fixed and supported with respect to the head frame structure 42. The output shaft of the hydraulic motor is connected with a worm 100 which drives a worm wheel 102 fixed on the shaft 96. An endless chain 104 encircles sprockets 106 and 108 respectively on the shafts 94 and 96 so that the shaft 94 is driven in unison with the shaft 96.

In order to promote uniform and smooth winding of the cables on the rollers, each of the rollers is formed with a helical groove for receiving and guiding its associated cable. In this connection particular attention is directed to FIGS. 5 and 6 which show the roller 92 in greater detail, which roller is formed with a helical groove 110 for accommodating the cable 84. In order to maintain the cables properly seated in the helical grooves of their respective rollers, means are provided for resiliently pressing the cables against the rollers. These means comprise rubber or resilient rollers 112, 114, 116 and 118 respectively associated with the rollers 72, 74, 90 and 92.

Again referring particularly to FIGS. 5 and 6, it is seen that the roller 118 has its shaft 120 rotatably supported at the outer ends of brackets 122 and 124, which brackets are pivotally connected at 126 and 128 to the frame member 46. In order to hold the roller 118 down against the roller 92, bolts 130 and 132 are provided. These bolts are respectively secured to the frame member 46 at 134 and 136 and extend upwardly through apertured ears 138 and 140 welded or otherwise fixed to the sides of the brackets 122 and 124. Nut members 142 and 144 threaded on the upper ends of the bolts 130 and 132 may be adjusted for adjusting the pressure with which the roller 118 is urged against the roller 92. As shown in FIG. 6, the yieldable and resilient surface of the roller 118 is adaped to form itself around the portions of the cable projecting from the helical groove 110 in the roller 92 for retaining the coils of the cable within the groove. It is, of course, understood that the remaining resilient rollers are adjustably mounted in the same manner as the roller 118.

In order to shift the frame members 34 and 36 between the retracted position shown in solid lines in FIG. 1 and the extended position shown in broken lines, fluid cylinder and piston means 146 and 148 are provided. The cylinder 146 has one end connected with an upstanding fixed frame member 150 of the trailer unit 16, and its associated piston rod connected at 152 with the frame member 34. The cylinder and piston means 148 has one end connected with a fixed frame member 154 of the trailer unit. The piston rod of the means 148 is pivotally connected at 156 to the frame member 36. It is to be understood of course that suitable hydraulic or fluid pressure lines and control valves are provided for the piston and cylinder means 146 and 148 as well as for the above mentioned rotary hydraulic motor 98 and the hydraulic cylinders associated with the shearing heads, and the lifting, delimbing, and feeding mechanisms.

As previously indicated, the rod 80 is adapted to connect the lower end portions of the cable providing the sling members 64 and 66. When it is desired to release or dump a bundle of logs carried by the sling members, the rod 80 is pulled axially forwardly so as to release the looped end portions of the cables. In order to pull the rod 80 in this manner, a chain 158 is connected between a hooked end portion 160 of the rod and a hook or lug element 162 on the carriage 24 of the log feeding means. With this arrangement, a single operator located at a work station 164 on the tractor unit of the vehicle may unload a stack or bundle of logs by first extending the cylinder and piston means 146 and 148 as shown in broken lines in FIG. 2, then connecting the chain 158 to the element 162 on the carriage which has previously been advanced to a position adjacent the shearing head 28 and then actuating the carriage 24 toward its forward position for pulling the rod 80 forwardly.

A brief resume of the manner in which a tree may be felled and processed with the apparatus described above is as follows:

The vehicle is first driven to a position adjacent a tree and the shearing head 18 is actuated for severing a tree and directing its fall forwardly along the side of the vehicle. The tree is then raised by the lifting mechanism 22 onto the carriage 24 which is positioned adjacent the forward end of the guide means 26 and the delimbing mechanism 30 is actuated for wrapping the flexible blade structure thereof around the trunk of the tree. Then the operator actuates the carriage 24 for feeding a predetermined length of the tree through the shearing head 28 and to a generally horizontally disposed but slightly upwardly inclined position well above the bottom of the frame structure of the trailer unit 16. The shearing head 28 is then actuated to sever the aforementioned length of the tree from the remainder of the trunk. However, before this severing action is accomplished, the cylinders 146 and 148 of the log receiving and retaining means 32 are actuated to position the frame members 34 and 36 as shown in solid lines in FIG. 1 and the fluid motor 98 is actuated for winding the sling cables up so that the bottom of the sling structure which is defined by the rod 80 is relatively close to and preferably only a few inches beneath the section of the tree to be severed. Then when the shearing head 28 is actuated, the severed tree section is substantially immediately caught and retained by the sling members. The tree feeding and severing operations are repeated, and as each tree section is severed, the hydraulic motor 98 is operated for lowering the sling members and the stack or bundle of logs retained thereby so that the top of the stack is substantially immediately below the next tree section to be severed.

After the desired bundle of logs has been accumulated in the sling members, the vehicle is driven to a suitable point of discharge and the logs are unloaded. The logs may be unloaded onto the ground or onto a truck 166 as shown in FIG. 1 or any other desired elevated surface or structure. It is to be noted that the sling cables may be extended so that the bundle of logs may be deposited directly on the ground without substantial falling. On the other hand, the sling cables may be retracted even to such an extent that the bundle of logs projects upwardly through the central opening provided by the generally rectangular frame or head structure 42 for enabling the bundle of logs to be positioned over and deposited on the truck 166 or a stack of logs previously deposited on the truck. After the bundle of logs has been positioned laterally of the vehicle as shown in FIG. 1, the chain 158 is pulled forwardly with the aid of the carriage 24 for withdrawing the rod 80. As the lower ends of the sling cables are released by the rod 80, the bundle of logs tends to spread laterally outwardly, but this spreading action is relatively slow and is accomplished in controlled manner since a portion of the logs will bear against the lower ends of the sling cables for frictionally restraining the cables sufficiently for causing the cables to disengage themselves from the legs in a controlled manner.

While the preferred embodiment of the present invention has been shown and described herein, it is obvious that many structural details may be changed without departing from the spirit and scope of the appended claims.

The invention is claimed as follows:

1. A timber harvesting apparatus comprising a vehicle, means mounted on said vehicle for feeding successive sections of a felled tree to a predetermined raised position, means mounted on said vehicle for successively severing said sections from the remainder of the tree when said sections are in said position, vertically adjustable means mounted on said vehicle for catching said sections and supporting them above the ground as they are severed and dropped by gravity from said position, said vertically adjustable means including a plurality of flexible members spaced apart longitudinally of said position and traversing and having opposite end portions supported at opposite sides of said position, and means adjusting said vertically adjustable means for enabling a plurality of said sections to be received and stacked on said vertically adjustable means while minimizing the distance which each tree section falls.

2. A timber harvesting apparatus, as defined in claim 1, which includes means for shifting said vertically adjustable means laterally of said vehicle for unloading a stack of said tree sections while holding said vertically adjustable means substantially parallel to the ground.

3. A timber harvesting apparatus, as defined in claim 1, wherein each of said flexible members comprises first and second separate opposite end portions, and means releasably connecting said opposite end portions with each other.

4. Apparatus for processing trees comprising mobile frame means, means mounted on said frame means for feeding successive sections of a felled tree to a predetermined elevated position, means on said frame means for severing said successive sections at said position from the remainder of the tree, means on said frame means including a plurality of spaced apart flexible members traversing and adjustably extending beneath said position for receiving and retaining said successive sections in a stack as the sections are severed and fall from the remainder of the tree, and means including rollers mounted along opposite sides of said position and connected with opposite end portions of said flexible members, means simultaneously rotating said rollers for adjusting said flexible members between locations relatively closely beneath said position and lowered locations for minimizing the distance which each tree section falls when it is severed from the remainder of the tree.

5. In an apparatus for harvesting trees, mobile means for receiving and retaining in a stack successive tree sections extending generally horizontally and falling by gravity from a predetermined elevated position, said means comprising a plurality of spaced apart flexible members traversing and extending beneath said position for catching successive tree sections and supporting the tree sections above the ground, rollers rotatably mounted at opposite sides of said position and adjustably supporting opposite end portions of said flexible members said rotatably mounted rollers having helical groove means therein for receiving and guiding the flexible members, and means connected with said rollers for actuating said rollers for vertically adjusting said flexible members for minimizing the distance which each tree section falls from said position.

6. An apparatus, as defined in claim 5, which includes resilient rollers associated with each of said first mentioned rollers and urging the flexible members against said first mentioned rollers for maintaining the flexible members in engagement with the groove means.

7. An apparatus, as defined in claim 5, which includes a generally rectangular frame structure horizontally disposed adjacent to and defining an open space above said position, said rollers at opposite end portions of the flexible members being mounted on opposite sides of said generally rectangular frame structure, and means supporting said frame structure for movement laterally of said position for facilitating unloading of a stack of tree sections at a desired location.

8. In an apparatus for harvesting trees,
mobile means for receiving and retaining in a stack successive tree sections extending generally horizontally and falling by gravity from a predetermined elevated position,
said means comprising a plurality of spaced apart flexible members traversing and extending beneath said position for catching successive tree sections and supporting the tree sections above the ground,
each of said flexible members comprising separate opposite end portions having adjacently disposed ends,
each of said end portions including loop means at the said end thereof,
a releasable member extending through the loop means of said adjacent ends for releasably securing said end portions together and permitting unloading of tree sections,
rollers rotatably mounted at opposite sides of said position and adjustably supporting the opposite end portions of said flexible members,
and means connected with said rollers for actuating said rollers for vertically adjusting said flexible members for minimizing the distance which each tree section falls from said position.

9. A timber harvesting apparatus comprising,
a vehicle,
means mounted on said vehicle for feeding successive sections of a felled tree to a predetermined raised position,
means mounted on said vehicle for successively severing said sections from the remainder of the tree when said sections are in said position,
a pair of horizontally extending support frame members,
parallelogram means supporting said pair of members on opposite sides of said position,
a plurality of vertically adjustable flexible members depending from and extending between spaced points on said frame members for catching said sections and supporting them above ground in parallel relationship as they are severed and dropped by gravity from said position,
means adjusting said vertically adjustable means for enabling a plurality of said sections to be received and stacked on said vertically adjustable means while minimizing the distance which each tree section falls,
and means moving said support frame members from a first position for catching said sections to a second unloading position horizontally spaced from said first position while said parallelogram means maintains said frame members substantially horizontal.

10. A timber harvesting apparatus comprising,
a vehicle,
means mounted on said vehicle for feeding successive sections of a felled tree to a predetermined raised position,
means mounted on said vehicle for successively severing said sections from the remainder of the tree when said sections are in said position,
a pair of horizontally extending support frame members,
means depending from and extending between spaced points on said horizontally extending frame members for catching and supporting said sections in parallel relationship as they are severed and dropped by gravity from said position, said depending means being vertically extensible and retractable to minimize the distance which each tree section falls,
parallelogram means supporting said frame member on said vehicle for movement relative to the rest of the vehicle from a first position for catching said sections to a second unloading position horizontally spaced from said first position while maintaining said frame substantially horizontal.

References Cited by the Examiner

UNITED STATES PATENTS

| 1,419,974 | 6/22 | McLaughlin | 59—86 |
| 1,908,146 | 5/33 | Hilton | 59—85 |
| 2,550,185 | 4/51 | Bush | 214—77 |
| 2,720,988 | 10/55 | McColl | 214—77 |
| 3,059,677 | 10/62 | Busch et al. | 144—3 |
| 3,102,563 | 9/63 | Horncastle | 144—3 |

FOREIGN PATENTS 969,007   4/58   Germany.

LESTER M. SWINGLE, *Primary Examiner.*

WILLIAM W. DYER, Jr., *Examiner.*